(12) United States Patent
Gu et al.

(10) Patent No.: US 11,168,764 B2
(45) Date of Patent: Nov. 9, 2021

(54) PLANETARY GEARBOX AND ASSOCIATED ROBOT JOINT AND ROBOT

(71) Applicant: ABB Schweiz AG, Baden (CH)

(72) Inventors: Hao Gu, Shanghai (CN); Jibo Yang, Shanghai (CN); Zhiqiang Tao, Beijing (CN); Jian Qin, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/034,131

(22) Filed: Sep. 28, 2020

(65) Prior Publication Data
US 2021/0010565 A1 Jan. 14, 2021

Related U.S. Application Data

(63) Continuation of application No. PCT/CN2018/093332, filed on Jun. 28, 2018.

(51) Int. Cl.
*F16H 1/32* (2006.01)
*B25J 9/10* (2006.01)

(52) U.S. Cl.
CPC ............. *F16H 1/32* (2013.01); *B25J 9/102* (2013.01); *F16H 2001/325* (2013.01)

(58) Field of Classification Search
CPC ...... B25J 9/102; F16H 1/32; F16H 2001/324; F16H 2001/325; F16H 55/06

(Continued)

(56) References Cited

U.S. PATENT DOCUMENTS

| 4,909,100 A * | 3/1990 | Takagi ................ B60K 17/16 475/174 |
| 7,390,281 B2 * | 6/2008 | Alfredsson ............ F16D 23/06 475/204 |

(Continued)

FOREIGN PATENT DOCUMENTS

| CN | 202284628 U | 6/2012 |
| CN | 103477122 A | 12/2013 |

(Continued)

OTHER PUBLICATIONS

Intellectual Property Office of the P.R. China, International Search Report & Written Opinion issued in corresponding Application No. PCT/CN2018/093332, dated Mar. 21, 2020, 10 pp.

*Primary Examiner* — Leslie A Nicholson, III
(74) *Attorney, Agent, or Firm* — Greenberg Traurig, LLP

(57) ABSTRACT

A planetary gearbox, including a housing extending along a first axis, an inner coupling mechanism arranged on an inner surface of the housing, an input component arranged within and coaxially with the housing and operable to rotate about the first axis, an engaging mechanism arranged in the housing and coupled to the input component, the engaging mechanism having a second axis offset from the first axis and adapted to be driven by the input component to rotate about the second axis while engaging with the inner coupling mechanism and an output component coupled to the engaging mechanism and adapted to be actuated by the rotation of the engaging mechanism to rotate about the first axis, wherein at least engaging surface of the inner coupling mechanism and at least engaging surface of the output component are made of one of metal and non-metal material, and at least engaging surface of the engaging mechanism is made of the other of metal and non-metal material.

18 Claims, 5 Drawing Sheets

(58) Field of Classification Search
USPC .......................................................... 475/168
See application file for complete search history.

(56) References Cited

U.S. PATENT DOCUMENTS

| | | | |
|---|---|---|---|
| 9,739,365 B2 | 8/2017 | Yelvington | |
| 10,233,033 B2* | 3/2019 | Launiere | ................... B23Q 7/00 |
| 10,377,037 B2* | 8/2019 | Du | ............................ F16H 1/46 |
| 10,717,608 B2* | 7/2020 | Launiere | ................ B65G 47/46 |

FOREIGN PATENT DOCUMENTS

| | | |
|---|---|---|
| EP | 0444790 A2 | 9/1991 |
| WO | 0111269 A1 | 2/2001 |

* cited by examiner

PLANETARY GEARBOX AND ASSOCIATED ROBOT JOINT AND ROBOT

FIELD

Embodiments of the present disclosure generally relate to a planetary gearbox as well as associated robot joint and robot.

BACKGROUND

A planetary gearbox is a gear system comprising one or more outer gears (i.e., planet gears) rotating about a central gears (i.e., sun gear). Typically, the planet gears are mounted on a movable arm or carrier, which itself may rotate relative to the sun gear. The planetary gearbox also incorporates the use of an outer ring gear or annulus engaging with the planet gears. Planetary gears are typically classified as simple or compound planetary gears. Simple planetary gears have one sun, one ring, one carrier, and one planet set.

As a kind of special planetary gearbox, a cycloidal speed reducer is capable of relatively high ratios in compact sizes. An input shaft of the cycloidal speed reducer drives an eccentric bearing that in turn drives the wheel in an eccentric, cycloidal motion. A perimeter of this wheel is geared to a stationary ring gear and has a series of output shaft pins or rollers placed through the face of the wheel. These output shaft pins directly drive the output shaft as the wheel rotates. The radial motion of the wheel is not translated to the output shaft.

Various components used in the planetary gearbox are all usually made of metal materials, making the planetary gearboxes heavy and do not meet the lightweight requirements to robots or robot joints. Furthermore, metal components with particularly complex shapes, such as gears, wheels or the like, typically require an extremely high cost to process. Furthermore, there are also some conventional planetary gearboxes assembled with all non-metal components. However, this kind of non-metal planetary gearbox has low transmission efficiency and low torque capacity, for example, only up to 5 Nm.

SUMMARY

Embodiments of the present disclosure provide a planetary gearbox comprising metal and non-metal components contacting or engaging with each other.

In a first aspect, a planetary gearbox is provided. The planetary gearbox comprises housing extending along a first axis; an inner coupling mechanism arranged on an inner surface of the housing; an input component arranged within and coaxially with the housing and operable to rotate about the first axis; an engaging mechanism arranged in the housing and coupled to the input component, the engaging mechanism having a second axis offset from the first axis and adapted to be driven by the input component to rotate about the second axis while engaging with the inner coupling mechanism; and an output component coupled to the engaging mechanism and adapted to be actuated by the rotation of the engaging mechanism to rotate about the first axis; wherein at least engaging surface of the inner coupling mechanism and at least engaging surface of the output component are made of one of metal and non-metal material, and at least engaging surface of the engaging mechanism is made of the other of metal and non-metal material.

By using the non-metal instead of metal material to make at least engaging surface of components in the planetary gearbox engaging with each other, the overall weight of the planetary gearbox is reduced. Furthermore, certain components which have complex shape may be integrally formed by molding the non-metal material to reducing the processing difficulty. Moreover, wear and stress between the metal and non-metal can be significantly reduced compared to those between the same materials. In addition, by making the metal components engaging with the non-metal components, the head treatment for the metal components may be reduced.

In some embodiments, the inner coupling mechanism comprises a plurality of cylindrical pins arranged evenly and parallel to the first axis, and a supporting structure formed with a plurality of grooves each for receiving the respective cylindrical pins. For the cycloidal type planetary gearbox, since there is no bending between the teeth and only rolling contacts between the pins and the engaging mechanism, using certain components made of non-metal may further increase the life of the planetary gearbox while maintaining lightweight.

In some embodiments, at least one of the inner coupling mechanism and the output component is made of metal material, and at least one of the supporting structure and the engaging mechanism is made of non-metal material. In this way, compared to the housing and the engaging mechanism made of metal, the manufacturing difficulty and cost may be significantly reduced and the precise may be increased accordingly.

In some embodiments, at least one of the supporting structure and the engaging mechanism are integrally formed respectively. As a result, manufacturing efficiency may be increased significantly.

In some embodiments, the non-metal material comprises materials that can be integrally formed and that can be self-lubricating. With this arrangement, the tribology properties between the components contacting with each other are enhanced, and the cost for making the planetary gearbox is reduced.

In some embodiments, the non-metal material comprises at least one of plastic and ceramics. The use of common non-metal material may further reduce costs.

In some embodiments, the input component comprises an input shaft extending along the first axis. The use of the input shaft as the input component making the planetary gearbox can be used in various occasions. Thus, the versatility of the planetary gearbox is improved.

In some embodiments, the input shaft comprises at least one supporting section centered on the second axis, and the engaging mechanism comprises at least one wheel, each wheel arranged on the respective supporting section. The use of eccentric supporting section and wheel arranged thereon to form the cycloidal type planetary gearbox can reduce the assembly difficulty.

In some embodiments, each wheel comprises a plurality of through holes arranged about the second axis, and wherein the output component comprises a plurality of output pins, each output pin arranged in the respective through hole and driven by a rotation of the wheel to cause the output component to rotate with the wheel. In this way, the transmission noise may be reduced.

In some embodiments, the output component further comprises an output flange and a support ring fixed on two ends of the output pins, respectively, wherein the at least one wheel is located between the output flange and the support ring. As a result, the assembly difficulty of the output component may be further reduced.

In some embodiments, each output pin is hollow and comprises internal threads formed at two ends, and wherein the output flange and the support ring are fixed on the ends of the output pins via bolts. The use of hollow output pin further reduces the overall weight of the planetary gearbox.

In some embodiments, the output pins are made of metal material to maintain the pre-tightening force and/or connection strength of the internal threads. In this way, the connection strength of the output component is enhanced.

In some embodiments, the output component further comprises an output ring arranged on the inner surface of the housing and rotatable about the first axis; a plurality of outer output pins each being received in respective groove formed evenly in an inner surface of the output ring to rotate with the output ring.

In some embodiments, the input component comprises a supporting section centered on the second axis, and the engaging mechanism comprises a first wheel and a second wheel fixed with each other and both arranged on the supporting section, wherein the first wheel is engaged with the inner coupling mechanism, and the second wheel is engaged with the plurality of outer output pins to drive the output ring to rotate.

In some embodiments, the output ring and the first and the second wheels are made of non-metal material and integrally formed respectively, and the plurality of outer output pins are made of metal material with standard size.

In second aspect, a robot joint comprising at least one of the above mentioned planetary gearboxes is provided.

In third aspect, a robot comprising at least one of the above mentioned robot joints is provided.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, same reference numerals usually represent same components.

Throughout the drawings, the same or similar reference symbols are used to indicate the same or similar elements.

DETAILED DESCRIPTION

The present disclosure will now be discussed with reference to several example embodiments. It is to be understood these embodiments are discussed only for the purpose of enabling those skilled persons in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

In the conventional solution, robot joints typically employ a planetary gearbox, in particular a cycloidal type planetary gearbox (i.e., a cycloidal drive or a cycloidal speed reducer), as deceleration and transmission devices. Various components used in the planetary gearbox are all usually made of metal materials, making the planetary gearboxes heavy and do not meet the lightweight requirements to robots or robot joints.

Furthermore, metal components with particularly complex shapes, such as gears, wheels or the like, typically require an extremely high cost to process. Furthermore, the precision of the metal components machined in this way is often difficult to meet the operational requirements.

In order to solve or at least partly solve the above problems, embodiments of the present disclosure provide a planetary gearbox. Now some example embodiments will be described with reference to FIGS. 1-4.

Figure 1:
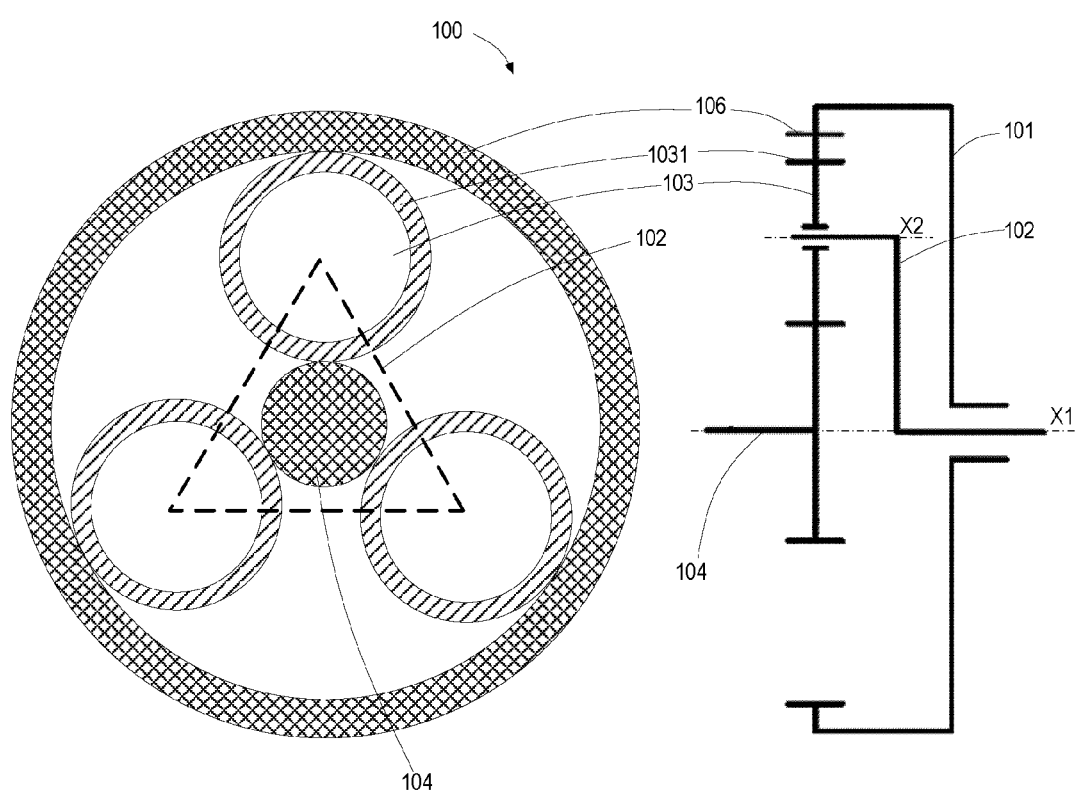
FIG. 1 shows schematic diagrams of a planetary gearbox according to embodiments of the present disclosure.

FIG. 1 shows schematic diagrams of a planetary gearbox 100 according to embodiments of the present disclosure. As shown, generally, the planetary gearbox 100 according to embodiments of the present disclosure comprises a housing 101, an inner coupling mechanism 106, an input component 102, an engaging mechanism 103 and an output component 104. The housing 101 extends along an axis (referred to as a first axis X1 hereafter for ease of discussion) and has a cylindrical inner surface.

The inner coupling mechanism 106 is arranged on the inner surface of the housing 101. In some embodiments, the inner coupling mechanism 106 may be a ring gear with internal teeth to be mounted on the inner surface of the housing 101 in any suitable ways, such as with fasteners or by interference fit. In some embodiments, the inner coupling mechanism 106 may comprise a plurality of cylindrical pins, which will be discussed in detail below. Alternatively, in some embodiments, the inner coupling mechanism 106 may be integrally formed on the housing 101.

The input component 102 is arranged coaxially in the housing 101 and can be driven by a power source, such as a motor or the like, to rotate about the first axis X1. The engaging mechanism 103 is arranged in the housing 101 and coupled to the input component 102. An axis (referred to as a second axis X2) of the engaging mechanism 103 offsets from the first axis X1.

In some embodiments, the input component 102 may be a carrier to carry the engaging mechanism 103, and the engaging mechanism 103 may be a gear engaging with the inner coupling mechanism 106 and the output component 104. In some embodiments, the input component 102 may be an input shaft with eccentric supporting section 1022 centered on the second axis X2 and the engaging mechanism 103 may be a wheel 1033 (for example, a cycloidal wheel) arranged on the supporting section 1022. That is, in these embodiments, the planetary gearbox 100 is a cycloidal type planetary gearbox, which will be discussed in detail below.

When the input component 102 is driven to rotate about the first axis X1, the engaging mechanism 103 can be driven the input component 102 to rotate about the second axis X2 while engaging with the inner coupling mechanism 106. In other words, the engaging mechanism 103 can obit around the first axis X1 and revolve about the second axis X2. The output component 104 coupled to the engaging mechanism 103 thus can be actuated by the rotation of the engaging mechanism 103 to rotate about the first axis X1.

Compared to the conventional planetary gearbox, in the planetary gearbox 100 according to embodiments of the present disclosure, at least engaging surface of the inner coupling mechanism 106 and at least engaging surface of the output component 104 are made of one of metal or non-metal material, and at least engaging surface of the engaging mechanism 103 is made of the other of metal and non-metal material. For example, in some embodiments, at least engaging surface of the inner coupling mechanism 106 and at least engaging surface of the output component 104 may be made of metal material and at least engaging surface of the engaging mechanism 103 is made of non-metal material.

By using the non-metal instead of metal material to make the engaging surface of components in the planetary gearbox 100 engaging or contacting with each other, such as the engaging mechanism 103, the overall weight of the planetary gearbox 100 and the cost for making the planetary gearbox 100 is reduced. In this way, the devices, such as robots, using the planetary gearbox 100 are also lightweight. Furthermore, certain components which have complex shape, or only the portions formed with complex shape may be integrally formed to reducing the processing difficulty. For example, in some embodiments, the inner coupling mechanism 106 and the output component 104 may be manufactured by molding the non-metal materials, such as plastic or the like. In this way, compared to the way of making these components by lathing and milling the metal materials, the components may be manufactured more precisely and cost efficiently. Furthermore, because the non-metal material does not require additional heat treatment and surface grinding, the manufacturing efficiency may be increased.

Furthermore, according to embodiments of the present disclosure, the components in the planetary gearbox 100 contacting or engaging with each other are made of different materials, which are metal and non-metal respectively. In this way, wear and stress between the metal and non-metal can be significantly reduced compared to those between the same materials and the planetary gearbox 100 manufactured in this way may be endurable. Furthermore, the engaging or contacting noise between the components can be reduced accordingly.

In some embodiments, the inner coupling mechanism 106 and the output component 104 may be that only the engaging surfaces thereof are made of metal material and other parts are made of other suitable material, to further reduce the cost. Alternatively, in some embodiments, the whole parts of inner coupling mechanism 106 and the output component 104 may all be made of metal material and the engaging mechanism 103 is made of non-metal material.

In some embodiments, the planetary gearbox 100 may be the cycloidal type planetary gearbox, as shown in FIGS. 2A, 2B, 3 and 4. For example, in some embodiments, the inner coupling mechanism 106 may comprise a plurality of cylindrical pins 1061 arranged evenly and parallel to the first axis X1, and a supporting structure arranged in the housing 101. The supporting structure may be formed with a plurality of grooves 1011 for receiving the respective cylindrical pins.

Each of the cylindrical pins 1061 may be embedded into the respective on of a plurality of grooves 1011 formed on the inner surface of the housing 101.

In some embodiments, the cylindrical pins 1061 may be standard components made of metal material, such as steel. On one hand, using metal as the cylindrical pins 1061 may ensure the strength of the cylindrical pins 1061 engaging with the engaging mechanism 103. On the other hand, the use of the standard components eliminates the need for a dedicated process of manufacturing the cylindrical pins 1061, reducing the cost and time of manufacturing accordingly.

Furthermore, considering the complex shape of the supporting structure with multiple arc-shaped grooves 1011, in some embodiments, the supporting structure may be integrally formed by molding the non-metal material, such as plastic. Compared to the way of manufacturing the supporting structure by latching and milling, the processing difficulty and cost are significantly reduced and the precision is increased accordingly. In some embodiments, the supporting structure and the housing 101 may be integrally formed together.

It should be understood that using the plastic as the non-metal material in the above embodiments is merely for illustration, without suggesting any limitations as to the scope of the present disclosure. Any other suitable non-metal material that can be integrally formed and that can be self-lubricating is possible as well. For example, the non-metal material may also be ceramics or the like.

In some embodiments, some suitable material, such as carbon fiber, glass fiber, Poly tetra fluoroethylene (PTFE) or the like, may be filled in the non-metal material, such as plastic. In this way, the performance of plastics can be further strengthened and the planetary gearbox may be more endurable.

Figure 2A:
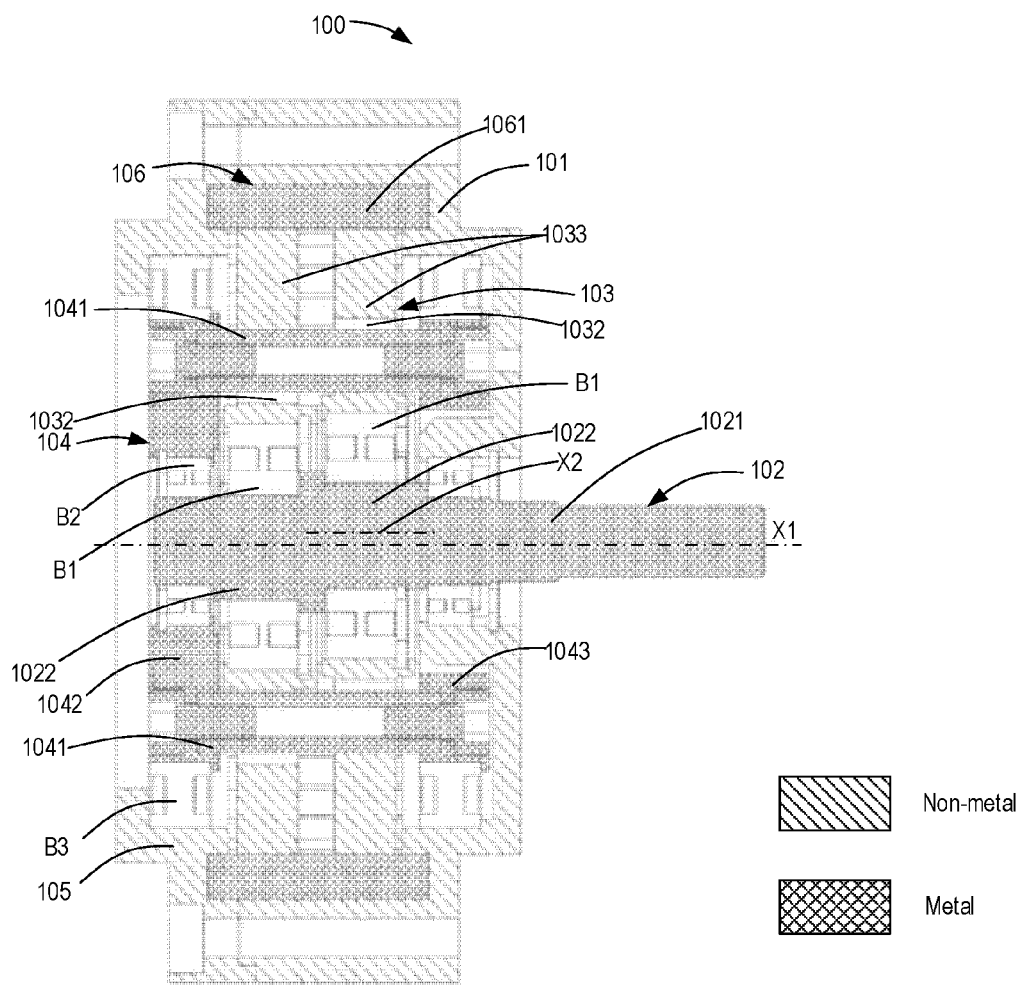
FIGS. 2A and 2B show sectional views of two embodiments of the cycloidal type planetary gearbox according to embodiments of the present disclosure.
Figure 2B:
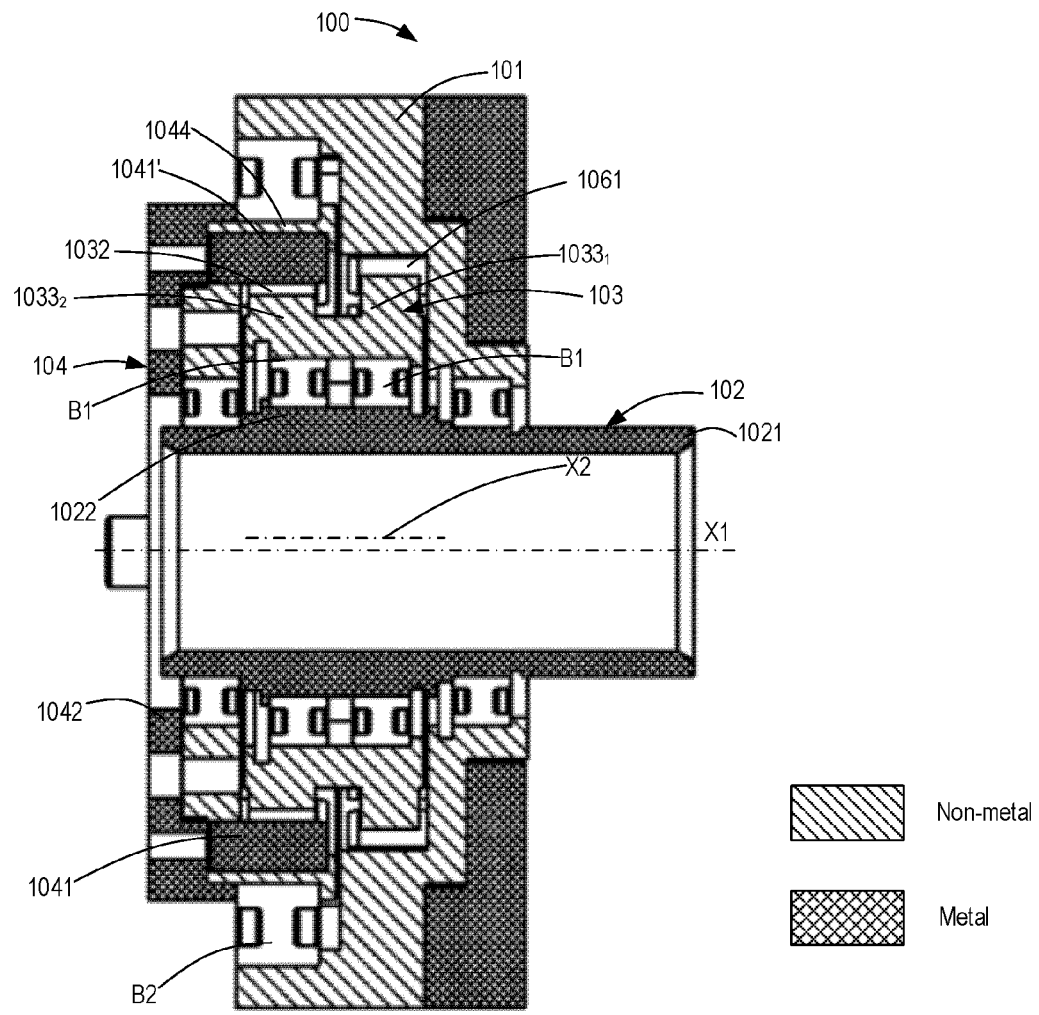

In some embodiments, as shown in FIGS. 2A and 2B, the input component 102 may comprise an input shaft extending along the first axis X1. The input shaft 1021 may be made of metal material, such as steel or the like. Using metal as the material of the input shaft 1021 may ensure the strength of the transmission. Furthermore, the metal input shaft 1021 may be manufactured more easily by lathing.

It should be understood that using the metal material as the material of the input shaft 1021 is merely for illustration, without suggesting any limitations as to the scope of the present disclosure. Any other suitable material is possible as well. For example, in some embodiments, the input shaft 1021 may be integrally formed by molding the non-metal material such as plastic or the like. Furthermore, the input shaft 1021 may have any suitable structure to meet various requirements. For example, in some embodiments, as shown in FIG. 2B, the input shaft 1021 may be hollow to allow the cables of the robot to pass through, facilitating the cables routing and thus making the robot joints using it more compact.

In some embodiments, at least one supporting section 1022 may be integrally or separately formed on the input shaft 1021 and the engaging mechanism 103 may comprise at least one wheel 1033. Each of the at least one wheel 1033 may be arranged on the respective supporting section 1022. Furthermore, a circumference of the wheel 1033 may be formed with a cycloidal gear profile, that is, the wheel 1033 may be a cycloidal wheel.

The cycloidal gear profile herein means a curve traced by a point on the rim of a circular wheel as the wheel rolls along a straight line or an inner rim of a bigger diameter circular wheel without slipping. In this way, when the input shaft 1021 is driven to rotate about the first axis X1, the wheel 1033 may rotate about the first axis X1 with the input shaft 1021 while engaging with the inner coupling mechanism 106, such as pins 1061, causing the wheel 1033 rotate about the second axis X2.

In these embodiments, considering the complex cycloidal gear profile formed on the circumference of the wheel 1033, the wheel 1033 may be integrally formed by molding the non-metal material, such as plastic. In this way, compared to the wheel made of metal, the manufacturing difficulty and cost may be significantly reduced and the precise may be increased accordingly.

It should be understood that the engaging mechanism 103 comprising the cycloidal wheel 1033 and the inner coupling mechanism 106 comprising pins 1061 in the above embodiments are merely for illustration, without suggesting any limitations as to the scope of the present disclosure. Any other suitable engaging mechanisms or structures are possible as well. For example, in some embodiments, the engaging mechanism 103 and the inner coupling mechanism 106 may be engaged with teeth or any other suitable means.

In some embodiments, the cycloid wheel 1033 may be arranged on the supporting section 1022 via a bearing (referred to as a first bearing B1), which ensures the relative rotation between the input shaft 1021 and the wheel 1033.

In some embodiments, at least one wheel 1033 may have two or more wheels 1033. In this case, the number of the at least one supporting section 1022 may be two or more accordingly. In some embodiments, each of the two or more supporting sections 1022 may be eccentric towards different directions perpendicular to the second axis X2. This ensures the coordination of the transmission.

Figure 3:
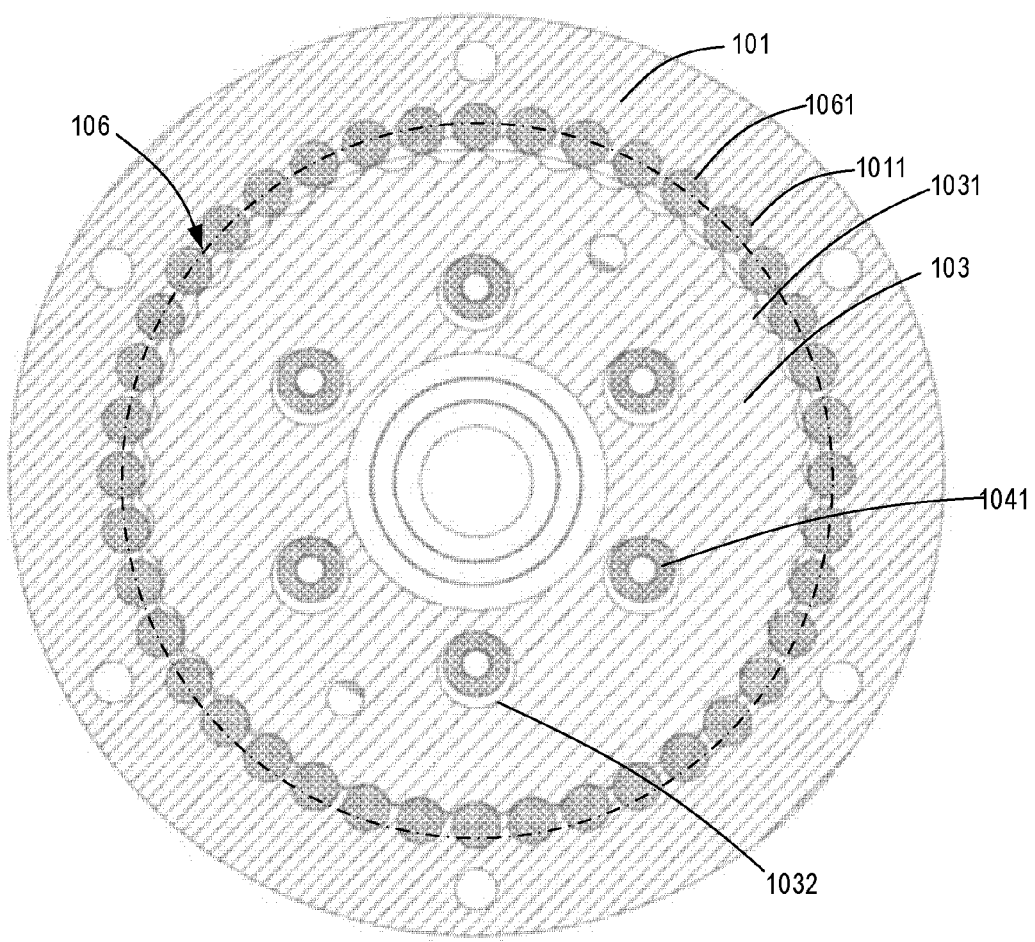
FIG. 3 shows a sectional side view of one embodiment of the cycloidal type planetary gearbox according to embodiments of the present disclosure.
Figure 4:
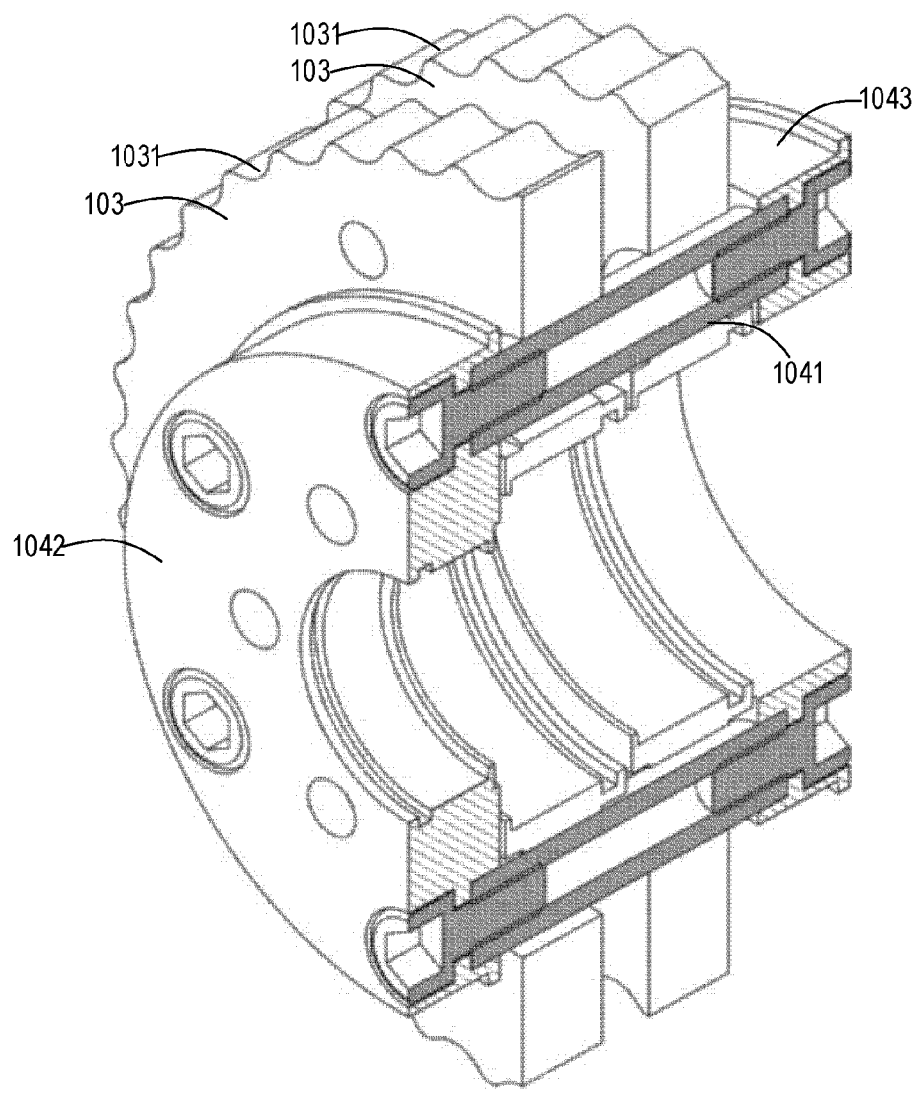
FIG. 4 shows a perspective view of wheels and the output assembly of the cycloidal type planetary gearbox according to embodiments of the present disclosure.

In some embodiments, as shown in FIGS. 2A, 3 and 4, a plurality of through holes 1032 parallel to the first axis X1 may be form on the wheel 1033. The output component 104 may comprise a plurality of output pins 1041 each arranged in the respective through hole 1032. As a result, in response to a rotation of the wheel 1033 about the second axis X2, the output component 104 may be driven by the wheel 1033 to rotate with the wheel 1033. Furthermore, in some embodiments, a diameter of the output pin 1041 may be slight smaller than the through hole 1032, so that the radial motion of the wheel 1033 about the first axis X1 is not translated to the output pins 1041.

In some embodiments, the output component 104 may be assembled using multiple separate parts. For example, in some embodiments, the output component 104 may comprise an output flange 1042 and a support ring 1043 fixed on the two ends of the output pins 1041 respectively. Furthermore, the wheel 1033 may be located between the output flange 1042 and the support ring 1043. In this way, the output component 104 may be assembled more easily.

Furthermore, in some embodiments, the output pin 1041 may be hollow and comprise internal threads formed at two ends. In this way, the output flange 1042 and the support ring 1043 may be fixed on the two ends of the output pins 1041 via bolts. It should be understood that the above implementation of fixing the output flange 1042 and the support ring 1043 with the bolts is merely for illustration, without suggesting any limitations as to the scope of the present disclosure. Any other suitable methods are possible as well. For example, the output flange 1042 and the support ring 1043 may be fixed on the output pin 1041 by welding or any other suitable methods.

In some embodiments, the output pins 1041 may be made of metal material to maintain the pre-tightening and/or connection strength of the internal threads. Furthermore, in some embodiments, in order to ensure the strength of the assembled output component 104, the output flange 1042 and the support ring 1043 may also be made of metal, such as steel, aluminum alloy or the like. Alternatively, in some embodiments, only the portions of the output flange 1042 and the support ring 1043 for the bolts through are made of metal. In this way, the overall weight of the planetary gearbox 100 may be further reduced. In some embodiments, the output component 104 may also be an integrated structure.

It should be understood that the above embodiments with respect to the engaging mechanism 103, the input component 102 and the output components 104 are merely for illustration, without suggesting any limitations as to the scope of the present disclosure. Any other suitable arrangements and structures are possible as well.

For example, in some embodiments, as shown in FIG. 2B, the output components 104 may further comprise an output ring 1044, a plurality of outer output pins 1041' and an output flange 1042. The output ring 1044 is arranged on the inner surface of the housing 101 via a bearing, so that the output ring 1044 may be rotatable about the first axis X1. The output ring 1044 may comprise a plurality of grooves formed on the inner surface thereof each for receiving the respective outer output pin 1041'. In this way, the outer output pins 1041' may rotate with the output ring 1044.

The output flange 1042 may be fixed on the outer output pins 1041', so that the rotation of the outer output pins 1041' about the first axis X1 may drive the output flange 1042 to rotate. In some embodiments, the input component 102 may comprise a supporting section 1022 centered on the second axis X2. The engaging mechanism 103 may comprise two wheels (for ease of discussion, referred to as a first wheel $1033_1$ and a second wheel $1033_2$ respectively) both arranged on the supporting section 1022. The first and second wheels $1033_1$, $1033_2$ may be fixed with each other. For example, the first and second wheels $1033_1$, $1033_2$ may be fixed with each other by fasteners or may be integrally formed.

In some embodiments, each of circumferences of the first and second wheels $1033_1$, $1033_2$ may be formed with a cycloidal gear profile, that is, both of the first and second wheels $1033_1$, $1033_2$ may be cycloidal wheels. The first wheel $1033_1$ may be engaged with the inner coupling mechanism 106, such as the plurality of cylindrical pins, and the second wheel $1033_1$ may be engaged with plurality of outer output pins 1041'. In this way, the output flange 1042 may be driven to rotate about the first axis X1. In some embodiments, the output flange 1042 may be omitted. In this case, the output ring 1044 and/or the outer output pins 1041' may be used as the component that provides output directly.

In some embodiments, considering the complex shapes of the output ring 1044 and the first and second wheels $1033_1$, $1033_2$, they may be integrally formed by molding the non-metal material. In this way, the cost and overall weight of the planetary gearbox 100 may be reduced and the planetary gearbox 100 can be more endurable due to the self-lubricating property of the non-metal. Furthermore, similar to the cylindrical pins, the outer output pins 1041' may also be made of metal material with standard size to reduce the cost.

In some embodiment, the planetary gearbox 100 may further comprise a cover 105 fixed on the housing 101, as shown in FIG. 2A. In order to maintain the relative movement between the output flange 1042 and the cover 105, a bearing (referred to as a third bearing B3) may be arranged between the output flange 1042 and the cover 105. Similarly, the output flange 1042 may be arranged on the input component 102 via bearing (referred to as a second bearing B2).

The cover 105 may be made of any suitable material. For example, in some embodiments, the cover 105 may be made of non-metal material, such as plastic, reducing the total weight of the planetary gearbox 100 while increasing the processing efficiency. Alternatively, in some embodiments, the cover 105 may also be made of metal material.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:

1. A planetary gearbox, comprising:
a housing extending along a first axis;
an inner coupling mechanism arranged on an inner surface of the housing;
an input component arranged within and coaxially with the housing and operable to rotate about the first axis;
an engaging mechanism arranged in the housing and coupled to the input component, the engaging mechanism having a second axis offset from the first axis and adapted to be driven by the input component to rotate about the second axis while engaging with the inner coupling mechanism; and
an output component coupled to the engaging mechanism and adapted to be actuated by the rotation of the engaging mechanism to rotate about the first axis;
wherein at least an engaging surface of the inner coupling mechanism and at least an engaging surface of the output component are made of one of metal and non-metal material, and at least an engaging surface of the engaging mechanism is made of the other of metal and non-metal material;
wherein the output component comprises an output flange and a support ring fixed on two ends of a plurality of output pins, respectively;
wherein each of the plurality of output pins is hollow and comprises internal threads formed at two ends;
wherein the output flange and the support ring are fixed on the ends of the plurality of output pins via bolts.

2. The planetary gearbox of claim 1, wherein the inner coupling mechanism comprises a plurality of cylindrical pins arranged evenly and parallel to the first axis, and
a supporting structure formed with a plurality of grooves each for receiving respective cylindrical pins.

3. The planetary gearbox of claim 2, wherein at least one of the inner coupling mechanism and the output component is made of metal material;
wherein at least one of the supporting structure and the engaging mechanism is made of non-metal material.

4. The planetary gearbox of claim 3, wherein at least one of the supporting structure and the engaging mechanism are integrally formed respectively.

5. The planetary gearbox of claim 1, wherein the non-metal material comprises materials that can be integrally formed and that can be self-lubricating.

6. The planetary gearbox of claim 1, wherein the non-metal material comprises at least one of plastic and ceramics.

7. The planetary gearbox of claim 1, wherein the input component comprises an input shaft extending along the first axis.

8. The planetary gearbox of claim 7, wherein the input shaft comprises at least one supporting section centered on the second axis, and
the engaging mechanism comprises at least one wheel, each wheel arranged on a respective supporting section.

9. The planetary gearbox of claim 8, wherein each wheel comprises a plurality of through holes arranged about the second axis;
wherein the output component comprises a plurality of output pins, each of the plurality of output pins arranged in a respective through hole and driven by a rotation of a respective wheel to cause the output component to rotate with the respective wheel.

10. The planetary gearbox of claim 9, wherein the output component further comprises an output flange and a support ring fixed on two ends of the plurality of output pins, respectively, wherein the at least one wheel is located between the output flange and the supporting ring.

11. The planetary gearbox of claim 1, wherein the plurality of output pins are made of metal material to maintain a pre-tightening and/or connection strength of the internal threads.

12. The planetary gearbox of claim 1, wherein the output component further comprises an output ring arranged on the inner surface of the housing and rotatable about the first axis; and
a plurality of outer output pins each being received in a respective groove formed evenly in an inner surface of the output ring to rotate with the output ring.

13. The planetary gearbox of claim 12, wherein the input component comprises a supporting section centered on the second axis, and
the engaging mechanism comprises a first wheel and a second wheel fixed with each other and both arranged on the supporting section,
wherein the first wheel is engaged with the inner coupling mechanism, and the second wheel is engaged with the plurality of outer output pins to drive the output ring to rotate.

14. The planetary gearbox of claim 13, wherein the output ring, the first wheel, and the second wheel are made of non-metal material and integrally formed respectively, and
the plurality of outer output pins are made of metal material with standard size.

15. A robot joint comprising at least one planetary gearbox of claim 1.

16. An apparatus, comprising:
a robot including a robot joint;
wherein said robot joint including a planetary gearbox comprising:
a housing extending along a first axis;
an inner coupling mechanism arranged on an inner surface of the housing;
an input component arranged within and coaxially with the housing and operable to rotate about the first axis;
an engaging mechanism arranged in the housing and coupled to the input component, the engaging mechanism having a second axis offset from the first axis and adapted to be driven by the input component to rotate about the second axis while engaging with the inner coupling mechanism; and an output component coupled to the engaging mechanism and adapted to be actuated by the rotation of the engaging mechanism to rotate about the first axis;

wherein at least an engaging surface of the inner coupling mechanism and at least an engaging surface of the output component are made of one of a metal and a non-metal material, and at least an engaging surface of the engaging mechanism is made of the other of the metal and the non-metal material;

wherein the output component comprises an output flange and a support ring fixed on two ends of a plurality of output pins, respectively;

wherein each of the plurality of output pins is hollow and comprises internal threads formed at two ends;

wherein the output flange and the support ring are fixed on the ends of the plurality of output pins via bolts.

17. The apparatus of claim 16, wherein the inner coupling mechanism comprises a plurality of cylindrical pins arranged evenly and parallel to the first axis, and a supporting structure formed with a plurality of grooves each for receiving respective cylindrical pins.

18. The apparatus of claim 17, wherein at least one of the inner coupling mechanism and the output component is made of metal material; and wherein at least one of the supporting structure and the engaging mechanism is made of non-metal material;

wherein at least one of the supporting structure and the engaging mechanism are integrally formed respectively.

* * * * *